US009736390B2

(12) United States Patent
Suzuki

(10) Patent No.: US 9,736,390 B2
(45) Date of Patent: Aug. 15, 2017

(54) IMAGE PROCESSING APPARATUS AND IMAGE PROCESSING METHOD

(71) Applicant: CANON KABUSHIKI KAISHA, Tokyo (JP)

(72) Inventor: Yasuo Suzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 43 days.

(21) Appl. No.: 14/788,883

(22) Filed: Jul. 1, 2015

(65) Prior Publication Data
US 2016/0006939 A1  Jan. 7, 2016

(30) Foreign Application Priority Data

Jul. 7, 2014 (JP) .................................. 2014-139478

(51) Int. Cl.
| | | |
|---|---|---|
| *H04N 5/202* | (2006.01) | |
| *H04N 5/235* | (2006.01) | |
| *G06T 5/50* | (2006.01) | |
| *G06T 5/00* | (2006.01) | |
| *H04N 5/265* | (2006.01) | |

(52) U.S. Cl.
CPC ........... *H04N 5/2355* (2013.01); *G06T 5/009* (2013.01); *G06T 5/50* (2013.01); *H04N 5/265* (2013.01); *G06T 2207/20208* (2013.01)

(58) Field of Classification Search
CPC ..................................................... H04N 5/202
USPC ....................................................... 348/254
See application file for complete search history.

(56) References Cited

U.S. PATENT DOCUMENTS

| | | | | |
|---|---|---|---|---|
| 6,747,694 | B1* | 6/2004 | Nishikawa | ........... H04N 5/2355 348/223.1 |
| 7,415,166 | B2 | 8/2008 | Kubota | |
| 7,508,421 | B2* | 3/2009 | Tamaru | ................. H04N 5/202 348/222.1 |
| 2015/0312542 | A1* | 10/2015 | Suginohara | .......... G09G 3/2003 345/603 |
| 2017/0078706 | A1* | 3/2017 | Van Der Vleuten | ... H04N 19/98 |

FOREIGN PATENT DOCUMENTS

JP          2005-142680 A      6/2005

* cited by examiner

*Primary Examiner* — Anthony J Daniels
(74) *Attorney, Agent, or Firm* — Fitzpatrick, Cella, Harper & Scinto

(57) ABSTRACT

An image processing apparatus according to the present invention includes: a first acquisition unit configured to acquire a first image; a second acquisition unit configured to acquire a second image; a characteristics acquisition unit configured to acquire characteristics information from the first image; a conversion unit configured to convert the first image to a third image by performing image processing in which a correspondence relationship of a gradation value and display brightness is made closer to a correspondence relationship in the second image, based on the characteristics information acquired by the characteristics acquisition unit; and a combination unit configured to generate a combined image by combining the second image and the third image.

22 Claims, 8 Drawing Sheets

CAPTURED IMAGE 201

GREEN BACKGROUND    OBJECT

CG IMAGE 202

COMBINED IMAGE 203

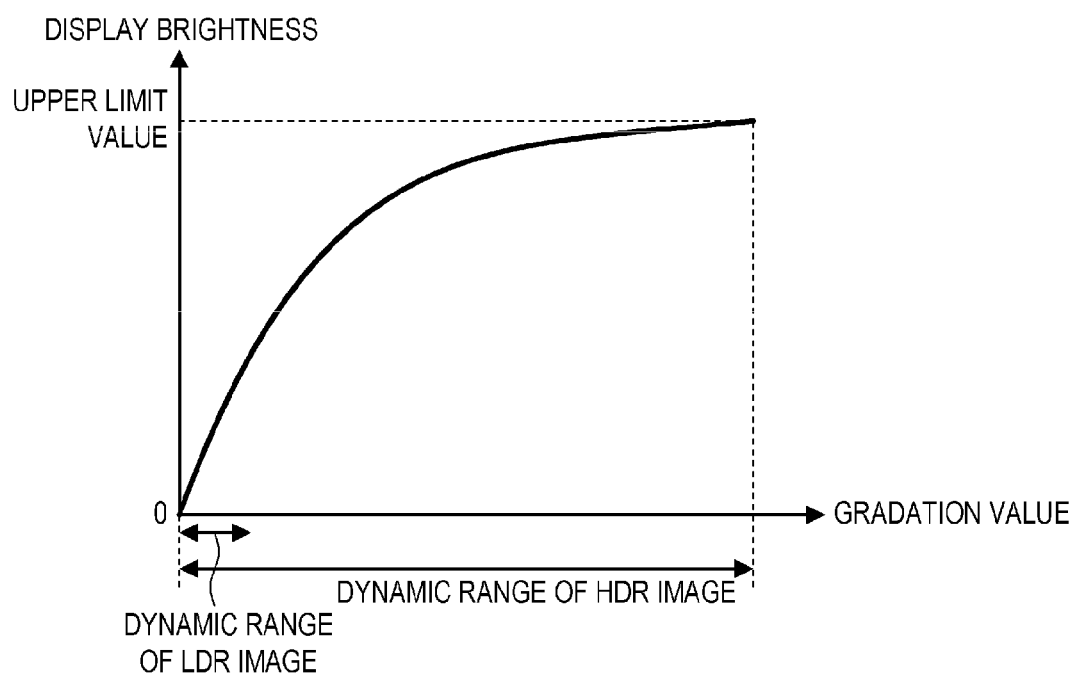

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

With increased digitalization of image production workflow in recent years, it has become possible to easily generate a combined image in which a captured image generated by capturing using an image capturing apparatus and a computer graphic image (hereinafter, "CG image") are combined.

Generation of a combined image is generally performed in post-production that is a step after a capturing step (step of performing capturing). Therefore, if there is a non-editable portion in a captured image at the time of generating a combined image, rework in the capturing step may occur.

Thus, a method is often employed in which a combining apparatus that generates (simply generates) a combined image is brought to a capturing location to generate and check a combined image at the capturing location. As the combining apparatus, a PC can be used, for example.

With such a method, a combined image can be checked (simply checked) in the capturing step, and the number of reworks in the capturing step can be reduced.

There are cases where the display brightness (brightness on screen) of a captured image differs greatly from the display brightness of a CG image.

In post-production, the display brightness of at least one of the captured image and the CG image is finely adjusted by an editor, so that the display brightness of the captured image is fit for the display brightness of the CG image.

However, since an editor is not always present at a capturing location, it is preferable that the display brightness of an image be automatically adjusted (simply adjusted) at a capturing location.

A technique of automatically adjusting the display brightness of an image is disclosed in Japanese Patent Application Laid-open No. 2005-142680, for example. In the technique disclosed in Japanese Patent Application Laid-open No. 2005-142680, the display brightness of each image is adjusted based on the average gradation value of one image, upon combining a plurality of images.

Along with the improvement in light-receiving performance of image capturing apparatuses in recent years, captured images having a wider dynamic range are being generated. As a data format for handling a captured image with a wider dynamic range, a data format having display characteristics (logarithmic characteristics) such that the display brightness changes logarithmically with respect to a change in the gradation value has been proposed. For example, at film production site, Cineon Log defined based on the characteristics of a film with a wide dynamic range is used as a data format.

On the other hand, a CG image generally has a narrow dynamic range. For example, BMP or JPEG is used as a data format for a CG image that is a still image, and JPEG 2000 is used as a data format of a CG image that is a video. The data formats cannot handle an image with a wide dynamic range, since the number of bits of a gradation value is 8 bits.

Therefore, there are cases where the dynamic range of a captured image and a dynamic range of a CG image greatly differ.

In the case where the dynamic ranges of a captured image and a CG image are the same, a suitable adjustment result (result of adjustment in the display brightness of an image) can be obtained by using the technique in Japanese Patent Application Laid-open No. 2005-142680.

However, in the case where the dynamic ranges of a captured image and a CG image are different, a suitable adjustment result cannot be obtained, even if the technique in Japanese Patent Application Laid-open No. 2005-142680 is used. For example, in the case of displaying a combined image in which an HDR image and an LDR image are combined, the display brightness of the HDR image cannot be made fit for the display brightness of the LDR image, even if the technique in Japanese Patent Application Laid-open No. 2005-142680 is used. An HDR image is an image with a wide dynamic range, e.g., a captured image. An LDR image is an image with a narrow dynamic range, e.g., a CG image.

An example of displaying a combined image in which an HDR image and an LDR image are combined will be described below.

As shown in FIG. 9, the LDR image has display characteristics (linear characteristics) such that the display brightness changes linearly with respect to a change in the gradation value (LDR gradation value).

On the other hand, as shown in FIG. 10, the HDR image has display characteristics (logarithmic characteristics) such that the display brightness changes logarithmically with respect to a change in the gradation value (HDR gradation value). The dynamic range of the HDR image is wider than that of the LDR image. The human vision is sensitive to a dark area, and it is preferable to allocate a narrow gradation range (range of gradation value) with respect to a range of low display brightness. Therefore, the logarithmic characteristics are frequently used as the display characteristics of an HDR image.

In FIGS. 9 and 10, a gradation value corresponding to a light intensity value is used as the gradation value, in order to clarify the difference of dynamic ranges of the HDR image and the LDR image. The light intensity value is a value converted from a gradation value according to the reverse characteristics of the gradation characteristics that are a change in the gradation value with respect to a change in the light intensity value. In the case where an image is a captured image, the light intensity value is a value representing the brightness of light (brightness of a captured scene) received by an image sensor (CMOS sensor or the like) of an image capturing apparatus. In the case where the gradation characteristics are gamma characteristics, a value converted from a gradation value according to reverse gamma characteristics coincides with the light intensity value.

As shown in FIGS. 9 and 10, the display brightness corresponding to the HDR gradation value differs from the display brightness corresponding to the LDR gradation value, even if the HDR gradation value and the LDR gradation value are equal. Therefore, a suitable adjustment result cannot be obtained, even if the technique in Japanese Patent Application Laid-open No. 2005-142680 is used. For example, the display brightness of the HDR image cannot be caused to coincide with the display brightness of the LDR image, even if the gradation value of the HDR image or the LDR image is adjusted such that the average gradation value of the HDR image coincides with the average gradation value of the LDR image.

SUMMARY OF THE INVENTION

The present invention provides a technique that enables suitable adjustment of the display brightness of a plurality of images, even in the case where the dynamic ranges of the plurality of images used for generating a combined image differ from each other.

The present invention in its first aspect provides an image processing apparatus comprising:

a first acquisition unit configured to acquire a first image;

a second acquisition unit configured to acquire a second image that is different in dynamic range from the first image;

a characteristics acquisition unit configured to acquire, from the first image, characteristics information representing at least one of a gradation value representing a bright area that is an area in the first image and is an area formed of a pixel with a gradation value greater than or equal to a first threshold value, and a size of the bright area;

a first conversion unit configured to convert the first image to a third image by performing image processing in which a correspondence relationship of a gradation value and display brightness is made closer to a correspondence relationship in the second image, based on the characteristics information acquired by the characteristics acquisition unit; and a combination unit configured to generate a combined image by combining the second image and the third image.

The present invention in its second aspect provides an image processing method comprising:

a first acquisition step of acquiring a first image;

a second acquisition step of acquiring a second image that is different in dynamic range from the first image;

a characteristics acquisition step of acquiring, from the first image, characteristics information representing at least one of a gradation value representing a bright area that is an area in the first image and is an area formed of a pixel with a gradation value greater than or equal to a threshold value, and a size of the bright area;

a conversion step of converting the first image to a third image by performing image processing in which a correspondence relationship of a gradation value and display brightness is made closer to a correspondence relationship in the second image, based on the characteristics information acquired in the characteristics acquisition step; and a combination step of generating a combined image by combining the second image and the third image.

The present invention in its third aspect provides a non-transitory computer readable medium that stores a program, wherein the program causes a computer to execute the image processing method.

With the pre sent invention, suitable adjustment of the display brightness of a plurality of images is made possible, even in the case where the dynamic ranges of the plurality of images used for generating a combined image differ from each other.

Further features of the present invention will become apparent from the following de script ion of exemplary embodiments with reference to the attached drawings.

BRIEF DESCRIPTION OF THE DRAWINGS

FIG. 10 is a diagram showing one example of the display characteristics of an HDR image.

DESCRIPTION OF THE EMBODIMENTS

<Embodiment 1>

An image processing apparatus and an image processing method according to Embodiment 1 of the present invention will be described below with reference to the drawings.

An example of a case where the image processing apparatus according to this embodiment is included in an image display apparatus will be described below. However, the image processing apparatus according to this embodiment may be an apparatus separate from the image display apparatus.

(Overall Configuration)

Figure 1:
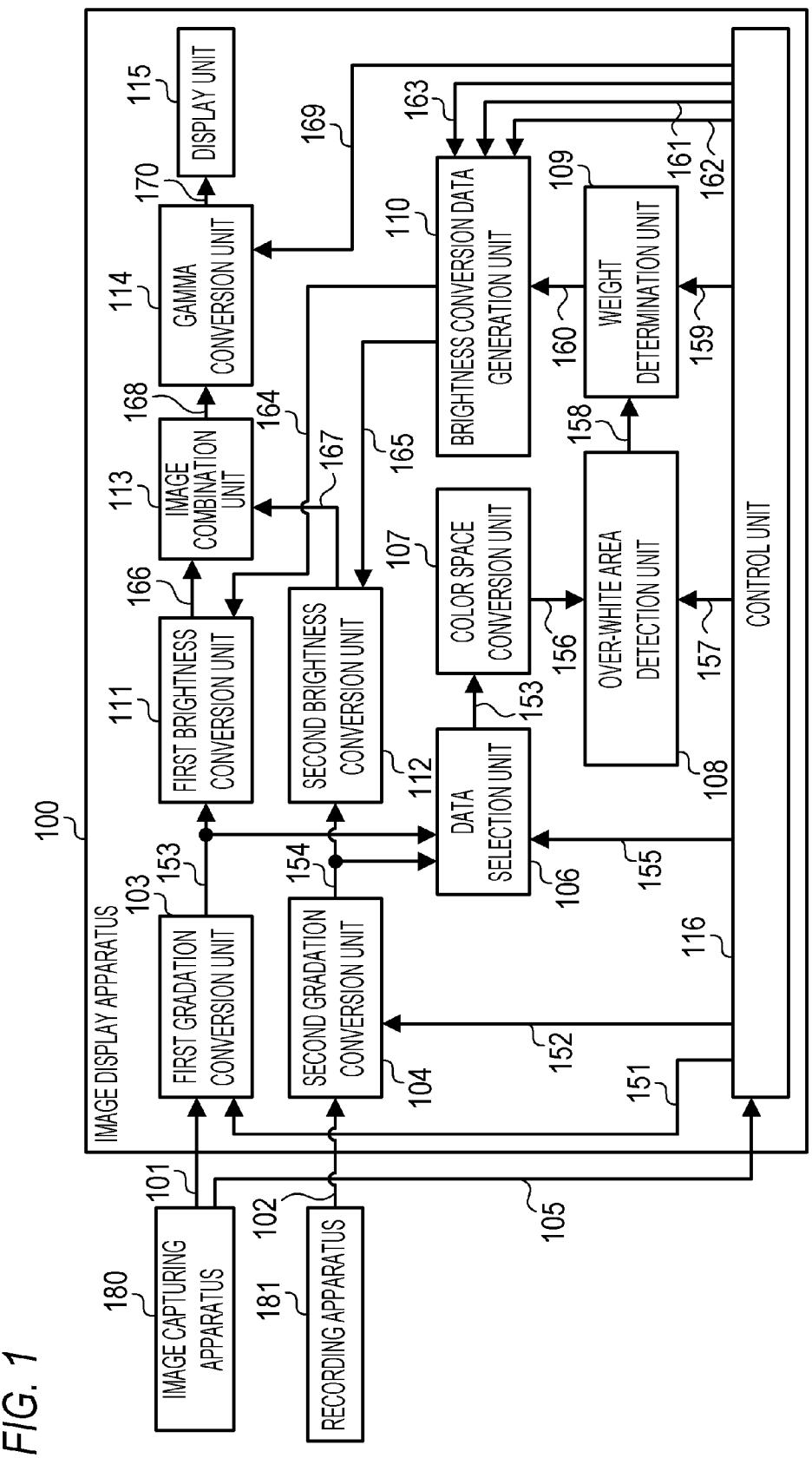
FIG. 1 is a block diagram showing one example of the functional configuration of an image display apparatus according to Embodiment 1.

FIG. 1 is a block diagram showing one example of the functional configuration of an image display apparatus 100 according to this embodiment. As shown in FIG. 1, the image display apparatus 100 includes a control unit 116, a first gradation conversion unit 103, a second gradation conversion unit 104, a data selection unit 106, a color space conversion unit 107, an over-white area detection unit 108, a weight determination unit 109, a brightness conversion data generation unit 110, a first brightness conversion unit 111, a second brightness conversion unit 112, an image combination unit 113, a gamma conversion unit 114, a display unit 115, and the like.

As shown in FIG. 1, the image display apparatus 100 is connected to an image capturing apparatus 180 and a recording apparatus 181.

The control unit 116 controls each functional unit included in the image display apparatus 100. In this embodiment, the control unit 116 sets the setting value used in each functional unit. Accordingly, processing in accordance with the setting value is executed in each functional unit. The setting value is, for example, read from a storage unit (such as a non-volatile memory) that is not shown and set. The setting value may be a fixed value set in advance by a manufacturer or the like or may be a value that can be changed by a user. The setting value may be generated and set based on captured image information 105 acquired from the image capturing apparatus 180. The captured image information 105 includes, for example, a capturing parameter (ISO sensitivity, frame rate, shutter speed, white balance, or the like) used at the time of capturing for generating first image data 101 described later.

The first gradation conversion unit 103 acquires the first image data 101 from the image capturing apparatus 180 (as first acquisition processing). Specifically, the first gradation conversion unit 103 acquires the first image data 101 from the image capturing apparatus 180 using a serial digital interface (SDI) cable.

In this embodiment, the first image data 101 is captured image data generated by capturing using the image capturing apparatus 180. The pixel value of the first image data 101 is an RGB value (a combination of an R value that is the gradation value of a red component, a G value that is the gradation value of a green component, and a B value that is the gradation value of a blue component). The gradation value (R value, G value, and B value) of the first image data 101 is a value of 10 bits that has undergone a logarithmic conversion. A "value that has undergone a logarithmic conversion" is a gradation value that has been converted using a logarithmic function from the gradation value in a reference unit. Hereinafter, the reference unit is referred to as "linear unit."

By using a value that has undergone a logarithmic conversion, transmission of HDR image data with a wide dynamic range can be achieved easily.

The first gradation conversion unit 103 generates first linear image data 153 by converting the gradation value of the first image data 101 to a gradation value in linear unit. In this embodiment, the first linear image data 153 is generated by converting the gradation value of the first image data 101 according to a first conversion curve 151 set by the control unit 116. The first conversion curve 151 is information (function or table) representing the correspondence relationship of the gradation value before conversion and the gradation value after conversion. The first gradation conversion unit 103 outputs the first linear image data 153.

The first image data 101 and the first linear image data 153 are image data representing a first image.

A method of acquiring the first image data 101 is not limited to the method described above, and the first image data 101 is not limited to the data described above. For example, the first image data 101 may be acquired using a cable other than an SDI cable, or the first image data 101 may be acquired wirelessly. The pixel value of the first image data 101 may be a YCbCr value (a combination of a Y value that is a brightness value, a Cb value that is a color difference value, and a Cr value that is a color difference value). The number of bits of the gradation value of the first image data 101 may be greater than or smaller than 10 bits. The first image data 101 may not be captured image data. The first image data 101 may be acquired from an external apparatus (external apparatus for the image display apparatus 100) different from the image capturing apparatus 180. The first image data 101 may be acquired from a storage unit (not shown) included in the image display apparatus 100. The first linear image data 153 may be acquired from an external apparatus for the image display apparatus 100, a storage unit included in the image display apparatus 100, or the like, without performing processing of converting the gradation value.

The second gradation conversion unit 104 acquires second image data 102 from the recording apparatus 181 (as second acquisition processing). Specifically, the second gradation conversion unit 104 acquires the second image data 102 from the recording apparatus 181 using an SDI cable.

In this embodiment, the second image data 102 is computer graphic image data (CG image data) generated by a personal computer (PC). The pixel value of the second image data 102 is an RGB value. The gradation value of the second image data 102 is a value of 8 bits that has been converted with gamma characteristics (1/2.2 gamma characteristics) in which the gamma value is 1/2.2. A "value that has been converted with 1/2.2 gamma characteristics" is a gradation value that has been converted from the gradation value in linear unit according to the 1/2.2 gamma characteristics.

In the case where the second image data 102 is an LDR image data with a narrow dynamic range and is data of a still image, BMP or JPEG can be used as the data format of the second image data 102. In the case where the second image data 102 is an LDR image data and is data of a video image, JPEG 2000 can be used as the data format of the second image data 102.

The second gradation conversion unit 104 generates second linear image data 154 by converting the gradation value of the second image data 102 to a gradation value in linear unit. In this embodiment, the second linear image data 154 is generated by converting the gradation value of the second image data 102 according to a second conversion curve 152 set by the control unit 116. The second conversion curve 152 is information (function or table) representing the correspondence relationship of the gradation value before conversion and the gradation value after conversion. The second gradation conversion unit 104 outputs the second linear image data 154.

The second image data 102 and the second linear image data 154 are both image data representing a second image. In this embodiment, the dynamic range of the second image differs from the dynamic range of the first image. Specifically, the dynamic range of the second image is narrower than the dynamic range of the first image and is a part of the dynamic range of the first image.

A method of acquiring the second image data 102 is not limited to the method described above, and the second image data 102 is not limited to the data described above. For example, the second image data 102 may be acquired using a cable other than an SDI cable, or the second image data 102 may be acquired wirelessly. The pixel value of the second image data 102 may be a YCbCr value. The number of bits of the gradation value of the second image data 102 may be greater than or smaller than 8 bits. The second image data 102 may not be CG image data. The second image data 102 may be acquired from an external apparatus (external apparatus for the image display apparatus 100) different from the recording apparatus 181. The second image data 102 may be acquired from a storage unit (not shown) included in the image display apparatus 100. The second linear image data 154 may be acquired from an external apparatus for the image display apparatus 100, a storage unit included in the image display apparatus 100, or the like, without performing processing of converting the gradation value.

The dynamic range of the second image may be wider than the dynamic range of the first image. The dynamic range of the second image may include a gradation range not included in the dynamic range of the first image.

The data selection unit 106 selects one of the first linear image data 153 and the second linear image data 154 and outputs the selected image data. Specifically, the data selection unit 106 is input with an HDR image selection instruction 155 from the control unit 116. In accordance with the HDR image selection instruction 155, the data selection unit 106 selects, as HDR image data, image data with a wider dynamic range out of the first linear image data 153 and the second linear image data 154 and outputs the selected image data. In this embodiment, the first linear image data 153 is selected as the HDR image data.

The color space conversion unit 107 generates brightness data 156 by converting the RGB value of each pixel of the first linear image data 153 output from the data selection unit 106 to a Y value (data brightness value). Then, the color space conversion unit 107 outputs the brightness data 156.

The over-white area detection unit 108 acquires, from the brightness data 156, characteristics information representing the size of a bright area (over-white area) that is an area in the first image and is an area formed of pixels with a gradation value that is greater than or equal to a threshold value (first threshold value) (as characteristics acquisition processing). In this embodiment, over-white size rate data 158 representing the proportion of the total number of pixels of an over-white area with respect to the total number of pixels of the first image is acquired as the characteristics information for the size of the over-white area. Then, the over-white area detection unit 108 outputs the over-white size rate data 158.

Specifically, the over-white area detection unit 108 first acquires a reference white brightness value 157 from the control unit 116. The reference white brightness value 157 is a data brightness value at the boundary of a range of the data brightness value of a bright area and a range of the data brightness value for other areas.

Next, the over-white area detection unit 108 detects a pixel with a brightness value (data brightness value) that is greater than or equal to the reference white brightness value 157 out of a plurality of pixels of the brightness data 156.

Then, the over-white area detection unit 108 calculates, as the over-white size rate, the proportion of the total number of detected pixels with respect to the total number of pixels of the brightness data 156.

Next, the over-white area detection unit 108 generates the over-white size rate data 158 representing the calculated over-white size rate and outputs the over-white size rate data 158.

In this manner, in this embodiment, the characteristics information is acquired from the first image by the color space conversion unit 107 and the over-white area detection unit 108.

The reference white brightness value 157 may be a fixed value set in advance by a manufacturer or the like or may be a value that can be changed by a user.

The characteristics information may not be information representing the over-white size rate. For example, the characteristics information may be information representing the total number of pixels with a data brightness value that is greater than or equal to the reference white brightness value 157.

In this embodiment, the first image is converted to a third image (as first conversion processing) based on the over-white size rate data 158 output from the over-white area detection unit 108, by the weight determination unit 109, the brightness conversion data generation unit 110, and the first brightness conversion unit 111. Specifically, the first linear image data 153 is converted to first brightness conversion image data 166, based on the over-white size rate data 158. In this embodiment, the first image is converted to the third image with a correspondence relationship of the gradation value and the display brightness (brightness on screen) that is closer to the correspondence relationship in the second image, as the size of a bright area (the over-white size rate represented by the over-white size rate data 158) is smaller.

The weight determination unit 109 generates weight information 160 representing the weight used by the brightness conversion data generation unit 110 in accordance with the over-white size rate data 158 output from the over-white area detection unit 108. Specifically, the weight information 160 is generated to represent a greater weight for a greater over-white size rate (size of a bright area) represented by the over-white size rate data 158. Then, the weight determination unit 109 outputs the weight information 160.

The brightness conversion data generation unit 110 generates first brightness conversion data 164 and second brightness conversion data 165, based on the weight information 160 output from the weight determination unit 109. The first brightness conversion data 164 is data for converting the gradation value of the first linear image data 153 to a gradation value in the same unit as the display brightness. The second brightness conversion data 165 is data for converting the gradation value of the second linear image data 154 to a gradation value in the same unit as the display brightness. The first brightness conversion data 164 and the second brightness conversion data 165 are, for example, information (function or table) representing the correspondence relationship of the gradation value before conversion and the gradation value after conversion. Then, the brightness conversion data generation unit 110 outputs the first brightness conversion data 164 and the second brightness conversion data 165.

In this embodiment, the brightness conversion data generation unit 110 acquires HDR brightness conversion data 161 that is initial data of the first brightness conversion data 164 and LDR brightness conversion data 162 that is initial data of the second brightness conversion data 165 from the control unit 116. The HDR brightness conversion data 161 is data representing the correspondence relationship of the gradation value and the display brightness of the first image, and the LDR brightness conversion data 162 is data representing the correspondence relationship of the gradation value and the display brightness of the second image.

The brightness conversion data generation unit 110 generates the first brightness conversion data 164 by weighted combination of the HDR brightness conversion data 161 and the LDR brightness conversion data 162 with the weight represented by the weight information 160. Specifically, the weight represented by the weight information 160 is used as the weight of the HDR brightness conversion data 161. Then, the brightness conversion data generation unit 110 outputs the first brightness conversion data 164.

The brightness conversion data generation unit 110 outputs the LDR brightness conversion data 162 as the second brightness conversion data 165.

As the weight information 160, information representing the weight of the LDR brightness conversion data 162 may be generated. As the weight information 160, information individually representing the weight of the HDR brightness conversion data 161 and the weight of the LDR brightness conversion data 162 may be generated.

The first brightness conversion unit 111 generates the first brightness conversion image data 166 by converting the gradation value of the first linear image data 153 using the first brightness conversion data 164. Then, the first brightness conversion unit 111 outputs the first brightness conversion image data 166. The first brightness conversion image data 166 represents the third image. In the case where the first brightness conversion data 164 is equivalent to the HDR brightness conversion data 161, the third image is equivalent to the first image. In the case where the first brightness conversion data 164 is different from the HDR brightness conversion data 161, the third image is different from the first image.

The second brightness conversion unit 112 generates second brightness conversion image data 167 by converting the gradation value of the second linear image data 154 using the second brightness conversion data 165. Then, the second brightness conversion unit 112 outputs the second brightness conversion image data 167. As described above, the second brightness conversion data 165 is the LDR brightness conversion data 162. Therefore, the second brightness conversion image data 167 represents the second image.

The image combination unit 113 generates a combined image by combining the third image and the second image. Specifically, the image combination unit 113 generates combined image data 168 representing the combined image by combining the first brightness conversion image data 166 and the second brightness conversion image data 167. Then, the image combination unit 113 outputs the combined image data 168.

Figure 2:
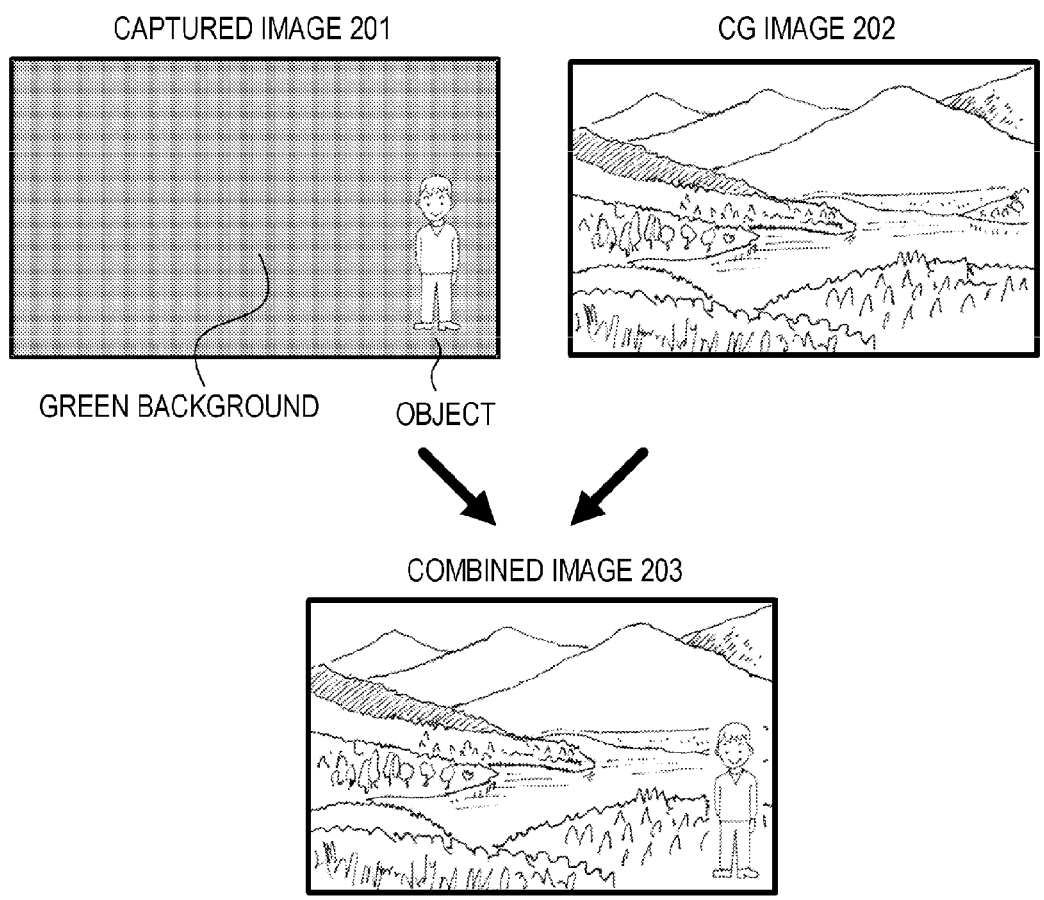
FIG. 2 is a diagram showing one example of chroma key processing according to Embodiment 1.

In this embodiment, chroma key processing is performed as combination processing of combining image data. One example of the chroma key processing is shown in FIG. 2.

First, a captured image (reference numeral 201 in FIG. 2) is generated by capturing an object (person or the like) in front of a green background (background such as a green cloth).

Next, a CG image (reference numeral 202 in FIG. 2) is generated with a PC or the like.

Then, by replacing the pixel values for an area of the green background among pixel values of the captured image with the pixel values for the CG image, a combined image (reference numeral 203 in FIG. 2) is generated.

The combination processing is not limited to the chroma key processing. For example, as the combination processing, alpha blending processing may be performed. In the alpha blending processing, the pixel value of a combined image is determined by combining the pixel value of one image and the pixel value of another image with a weight in accordance with a combination rate (alpha blending value). For example, the alpha blending value is determined with respect to each pixel of a CG image at the time of generating the CG image. Then, for a pixel with an alpha blending value of 0.3, the pixel value of the CG image is multiplied by the weight 0.3, and the pixel value of a captured image is multiplied by the weight 0.7. Then, by adding the two pixel values after multiplication with the weights, the pixel value of the combined image is calculated.

The gamma conversion unit 114 generates display image data 170 by converting the gradation value of the combined image data 168 to a driving gradation value according to the driving characteristics (correspondence relationship of the driving gradation value (gradation value for driving the display unit 115) and the display brightness) of the display unit 115. Specifically, the gamma conversion unit 114 acquires driving characteristics information 169 representing the driving characteristics of the display unit 115 from the control unit 116. Then, the gamma conversion unit 114 generates the display image data 170 by converting the gradation value of the combined image data 168 to the driving gradation value according to the driving characteristics represented by the driving characteristics information 169.

The display image data 170 is also image data representing the combined image.

The driving characteristics of the display unit 115 changes depending on the type or the like of a display element included in the display unit 115.

The display unit 115 displays an image based on the display image data 170 output from the gamma conversion unit 114 in a screen. Specifically, the display unit 115 includes a plurality of display elements arranged in a matrix. By respective display elements being driven in accordance with the display image data 170, the image is displayed in a screen. As the display element, a liquid crystal element, an organic EL element, a plasma element, or the like can be used.

(Gradation Characteristics and Display Characteristics)

The gradation characteristics of each piece of image data used in this embodiment will be described below.

In this embodiment, the first image data 101 and the second image data 102 both have non-linear characteristics such that the gradation value changes non-linearly with respect to a change in the light intensity value. Specifically, the first image data 101 has gradation characteristics (logarithmic characteristics) such that the gradation value changes logarithmically with respect to a change in the light intensity value. The second image data 102 has gradation characteristics such that a change in the gradation value with respect to a change in the light intensity value shows 1/2.2 gamma characteristics. The light intensity value is a value converted from a gradation value according to the reverse characteristics of the gradation characteristics. In the case where image data is captured image data, the light intensity value is a value representing the brightness of light (brightness of a captured scene) received by an image sensor (CMOS sensor or the like) of the image capturing apparatus 180.

In this embodiment, the range (dynamic range) of light intensity value that can be expressed with the first image data 101 is wider than the range of light intensity value that can be expressed with the second image data 102.

In this embodiment, the first linear image data 153 and the second linear image data 154 both have linear characteristics such that the gradation value changes linearly with respect to a change in the light intensity value.

In this embodiment, the first brightness conversion image data 166, the second brightness conversion image data 167, and the combined image data 168 all have gradation characteristics such that the gradation value coincides with the display brightness. In other words, the first brightness conversion image data 166, the second brightness conversion image data 167, and the combined image data 168 all have display characteristics such that the display brightness changes linearly with respect to a change in the gradation value.

In this embodiment, the display image data 170 has display characteristics such that a change in the display brightness with respect to a change in the gradation value shows 1/2.2 gamma characteristics.

(Over-white Size Rate)

A specific method of determining the over-white size rate will be described.

For the sake of description, it is assumed below that the dynamic range of the first image data 101 is a dynamic range corresponding to 0 to 800% in light intensity value, and the gradation value of the first image data 101 is a 10-bit value. It is assumed that the dynamic range of the second image data 102 is a dynamic range corresponding to 0 to 100% in light intensity value, and the gradation value of the second image data 102 is an 8-bit value. It is assumed that the reference white brightness value is a data brightness value corresponding to 100% in light intensity value.

The first image data 101, the second image data 102, and the reference white brightness value are not limited to the data described above.

The first gradation conversion unit 103 converts the first image data 101 to the first linear image data 153. Specifically, the gradation value (gradation value of the first image data 101) of which the gradation characteristics are logarithmic and the number of bits is 10 bits is converted to a gradation value of which the gradation characteristics are linear and the number of bits is 12 bits. Accordingly, the first image data 101 is converted to the first linear image data 153.

The second gradation conversion unit 104 converts the second image data 102 to the second linear image data 154. Specifically, the gradation value (gradation value of the second image data 102) of which the gradation characteristics are 1/2.2 gamma characteristics and the number of bits is 8 bits is converted to a gradation value of which the gradation characteristics are linear and the number of bits is 12 bits. Accordingly, the second image data 102 is converted to the second linear image data 154.

The color space conversion unit 107 converts the RGB value of each pixel of the first linear image data 153 to a data brightness value (Y value). Accordingly, the first linear image data 153 is converted to the brightness data 156. In this embodiment, an RGB value is converted to a Y value using the following formula 1. In formula 1, "Y" is a Y value, "R" is an R value, and "B" is a B value.

$$Y = 0.299 \times R + 0.587 \times G + 0.114 \times B \qquad \text{(Formula 1)}$$

In this embodiment, a 12-bit R value, G value, and B value are converted to a 12-bit Y value.

The over-white area detection unit 108 determines the over-white size rate, based on the brightness data 156.

As described above, in this embodiment, the data brightness value corresponding to 100% in light intensity value is used as the reference white brightness value. Therefore, in the case where the brightness data 156 is generated such that the Y value corresponding to 0% in light intensity value is 0 and the Y value corresponding to 800% in light intensity value is 4095, 512 is used as the reference white brightness value.

The over-white area detection unit 108 detects, as an over-white pixel (pixel of an over-white area), a pixel with a Y value that is greater than or equal to 512 and less than or equal to 4095 among a plurality of pixels of the brightness data 156.

Then, the over-white area detection unit 108 determines (calculates) the over-white size rate using the following formula 2. In formula 2, "A" is the total number of pixels of the brightness data 156, "B" is the total number of over-white pixels, and "C" is the over-white size rate.

$$C = (B/A) \times 100 \qquad \text{(Formula 2)}$$

As the over-white size rate C, a value that is greater than or equal to 0% and less than or equal to 100% is obtained.

As described above, the reference white brightness value 157 may be a fixed value set in advance by a manufacturer or the like or may be a value that can be changed by a user. In the case where the reference white brightness value 157 is included in the captured image information 105 acquired from the image capturing apparatus 180, the over-white size rate may be determined using the reference white brightness value 157 included in the captured image information 105.

Figure 3:
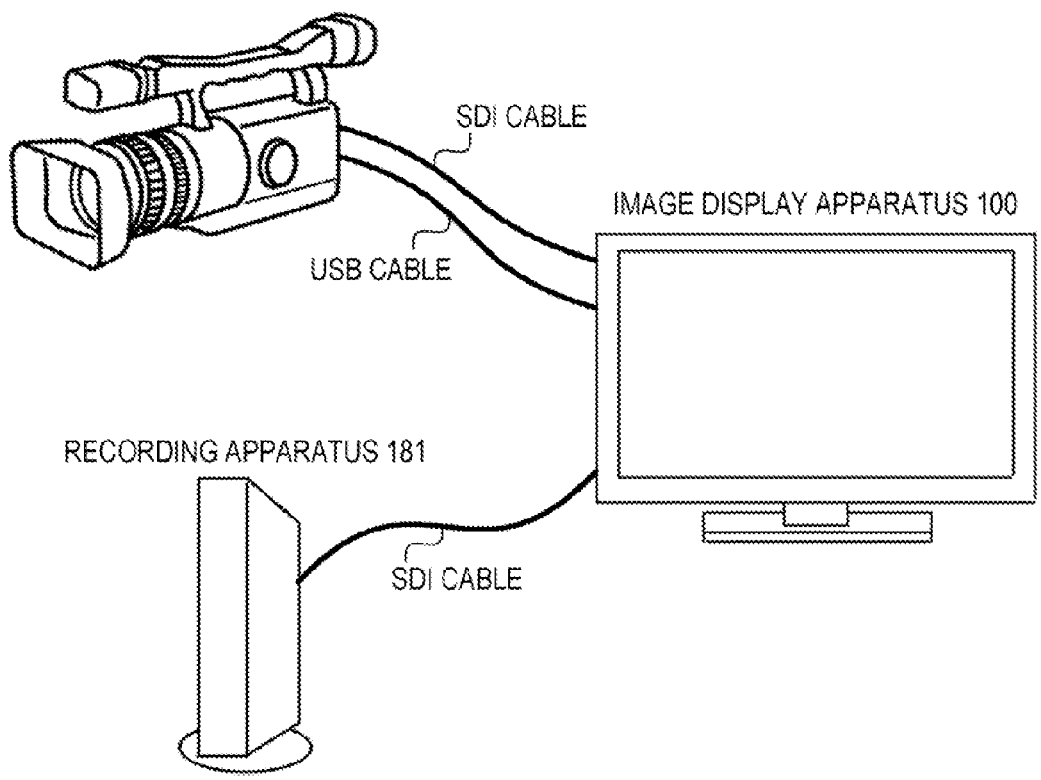
FIG. 3 is a diagram showing one example of a method of connection between apparatuses according to Embodiment 1.

The captured image information 105 is acquired, for example, using a transmission path separate from that of the first image data 101. For example, the first image data 101 is acquired using an SDI cable, and the captured image information 105 is acquired using a Universal Serial Bus (USB) cable. FIG. 3 shows one example of a connection method for the image capturing apparatus 180, the recording apparatus 181, and the image display apparatus 100. In the example in FIG. 3, the recording apparatus 181 and the image display apparatus 100 are connected to each other using an SDI cable. The image capturing apparatus 180 and the image display apparatus 100 are connected to each other using an SDI cable. The image capturing apparatus 180 and the image display apparatus 100 are connected to each other using a USB cable.

The captured image information 105 may be acquired using a cable other than a USB cable, or the captured image information 105 may be acquired wirelessly. The captured image information 105 may be acquired using the same transmission path as for the first image data 101.

(First Brightness Conversion Data and Second Brightness Conversion Data)

Next, a specific method of generating the first brightness conversion data 164 and the second brightness conversion data 165 will be described.

The weight determination unit 109 determines the weight to be used upon weighted combination of the HDR brightness conversion data 161 and the LDR brightness conversion data 162, in accordance with the over-white size rate data 158. Then, the weight determination unit 109 outputs the weight information 160 representing the determined weight.

Figure 4:
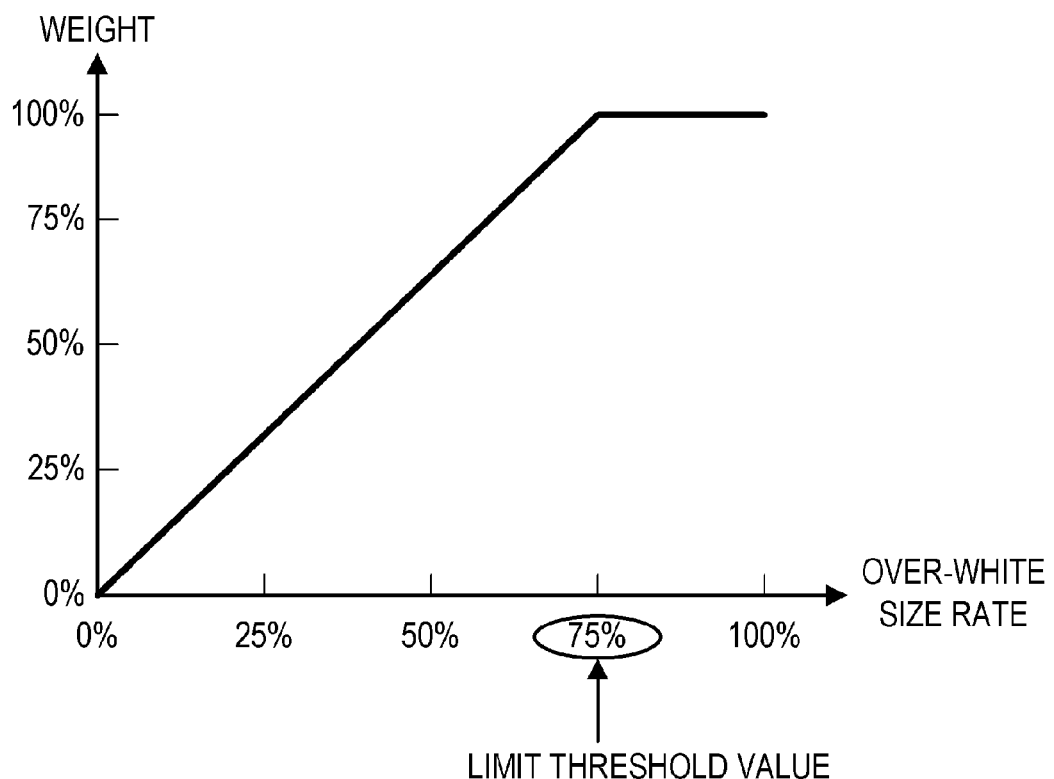
FIG. 4 is a diagram showing one example of a method of determining the weight of HDR brightness conversion data according to Embodiment 1.

In this embodiment, the weight of the HDR brightness conversion data 161 is determined. Specifically, the weight of the HDR brightness conversion data 161 is determined from the over-white size rate represented by the over-white size rate data 158, based on the correspondence relationship shown in FIG. 4. FIG. 4 shows one example of the correspondence relationship of the over-white size rate and the weight of the HDR brightness conversion data 161. In the case where the over-white size rate is a value less than or equal to a limit threshold value 159, a value that is greater for a greater over-white size rate is acquired as the weight of the HDR brightness conversion data 161. In the case where the over-white size rate is a value greater than or equal to the limit threshold value 159, 100% is acquired as the weight of the HDR brightness conversion data 161. In the example in FIG. 4, the limit threshold value 159 is 75%. Therefore, in the case where the over-white size rate is greater than or equal to 0% and less than or equal to 75%, the weight of the HDR brightness conversion data 161 is determined such that the weight of the HDR brightness conversion data 161 increases linearly from 0% to 100% along with an increase in the over-white size rate. In other words, the weight of the LDR brightness conversion data 162 is determined such that the weight of the LDR brightness conversion data 162 decreases linearly from 100% to 0% along with an increase in the over-white size rate. In the case where the over-white size rate is a value greater than or equal to 75% and less than or equal to 100%, 100% is acquired as the weight of the HDR brightness conversion data 161. In other words, 0% is acquired as the weight of the LDR brightness conversion data 162.

The limit threshold value 159 is acquired from the control unit 116, for example.

The limit threshold value 159 may be greater than or smaller than 75%. The limit threshold value 159 may be a fixed value set in advance by a manufacturer or the like or may be a value that can be changed by a user.

The correspondence relationship of the over-white size rate and the weight of the HDR brightness conversion data 161 is not limited to the correspondence relationship shown in FIG. 4. For example, the weight of the HDR brightness conversion data 161 may increase non-linearly along with an increase in the over-white size rate.

The brightness conversion data generation unit 110 acquires the HDR brightness conversion data 161 and the LDR brightness conversion data 162 from the control unit 116.

The control unit 116 generates the HDR brightness conversion data 161 based on the dynamic range of the first image. In this embodiment, it is assumed that the captured image information 105 includes range information representing the dynamic range of the first image. From the range information included in the captured image information 105, the dynamic range of the first image is grasped.

The HDR brightness conversion data 161 may be included in the captured image information 105. The HDR brightness conversion data 161 may be acquired from the captured image information 105.

Figure 5:
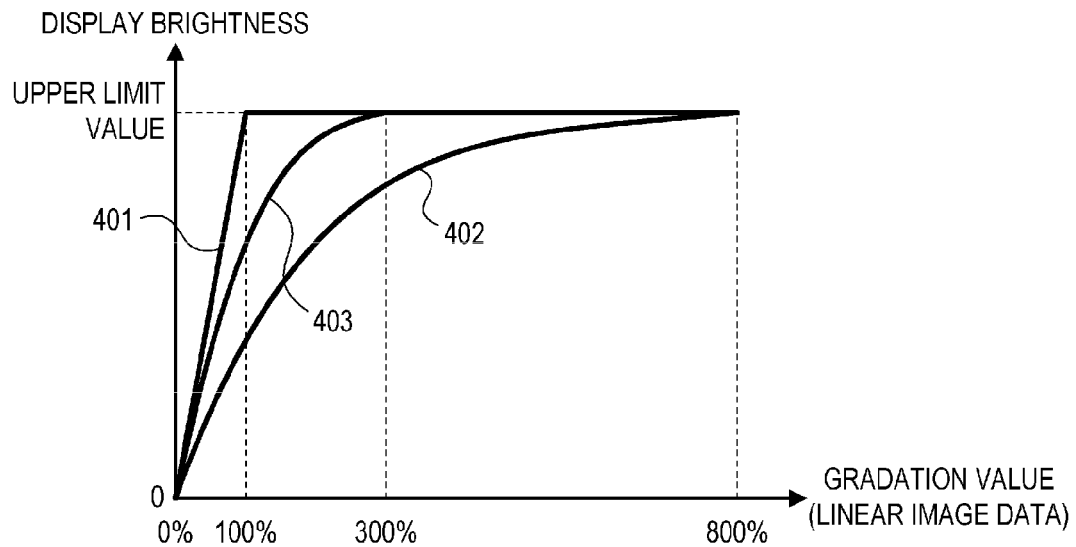
FIG. 5 is a diagram showing one example of LDR/HDR brightness conversion data according to Embodiment 1.

One example of the LDR brightness conversion data and the HDR brightness conversion data is shown in FIG. 5.

Reference numerals 402 and 403 in FIG. 5 show one example of the correspondence relationship of the gradation value of the first image (gradation value of the first linear image data 153) and the display brightness. The correspondence relationship 402 shows the correspondence relationship (HDR brightness conversion data) in the case where the dynamic range of the first image is a range of 0% to 800% in light intensity value. The correspondence relationship 403 shows the correspondence relationship (HDR brightness conversion data) in the case where the dynamic range of the first image is a range of 0% to 300% in light intensity value.

The human vision is sensitive to a dark area, and it is preferable to allocate a narrow gradation range (range of gradation value) with respect to a range of low display brightness. Therefore, in the example in FIG. 5, logarithmic characteristics such that the display brightness increases logarithmically with respect to an increase in the gradation value are used as the display characteristics (correspondence relationship of the gradation value and the display brightness) of the first image.

As shown in FIG. 5, the correspondence relationship 403 differs from the correspondence relationship 402. Specifically, in the correspondence relationship 403, more display brightness is allocated with respect to a dark area (gradation range of 0% to 100%) that is a range where the gradation value is less than or equal to a threshold value (second threshold value) than in the correspondence relationship 402. In this manner, in this embodiment, the HDR brightness conversion data is switched and used in accordance with the dynamic range of the first image. That is, the HDR brightness conversion data changes depending on the dynamic range of the first image.

In a similar manner, the control unit 116 generates the LDR brightness conversion data 162 based on the dynamic range of the second image. Reference numeral 401 in FIG. 5 shows one example of the correspondence relationship of the gradation value of the second image (gradation value of the second linear image data 154) and the display brightness. The correspondence relationship 401 shows the correspondence relationship (LDR brightness conversion data) in the case where the dynamic range of the second image is a range of 0% to 100% in light intensity value. In the example in FIG. 5, linear characteristics such that the display brightness increases linearly with respect to an increase in the gradation value are used as the display characteristics (correspondence relationship of the gradation value and the display brightness) of the second image.

The dynamic range of the second image may be defined in advance. In that case, the LDR brightness conversion data 162 can be prepared in advance.

The brightness conversion data generation unit 110 generates the first brightness conversion data 164 and the second brightness conversion data 165, based on the weight information 160, the HDR brightness conversion data 161, and the LDR brightness conversion data 162.

Upon checking a combined image at a capturing location, the first image is often checked as the reference of brightness for the second image. Thus, in this embodiment, the first brightness conversion data 164 is generated by converting the HDR brightness conversion data 161 with the LDR brightness conversion data 162 as the reference. Specifically, the first brightness conversion data 164 is generated by converting the HDR brightness conversion data 161 such that the display brightness corresponding to a dark area (gradation range of 0% to 100%) comes close to the LDR brightness conversion data 162 without a sense of incongruity.

When the display brightness corresponding to the dark area is made too close to the LDR brightness conversion data 162, blown-out highlights occur in the third image. Specifically, a sufficient amount of display brightness cannot be allocated to a non-dark area (gradation range of 100% to 800%) that is a range where the gradation value is greater than or equal to the threshold value, and the blown-out highlights occur in an area having a gradation value of the non-dark area.

When the display brightness corresponding to a dark area is too far from the LDR brightness conversion data 162 (too close to the HDR brightness conversion data 161), the third image is generated to be extremely dark in the display brightness of the dark area compared to the second image.

Thus, in this embodiment, weighted combination of the HDR brightness conversion data 161 and the LDR brightness conversion data 162 is performed with the weight represented by the weight information 160. Accordingly, the first brightness conversion data 164 in which the display brightness corresponding to a dark area is made appropriately close to the LDR brightness conversion data 162 can be obtained.

Figure 6:
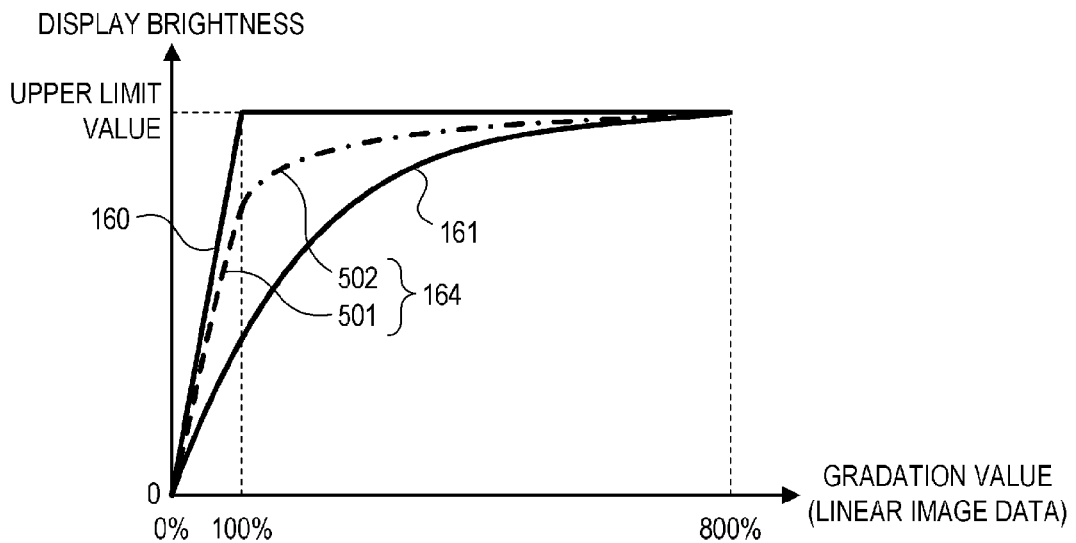
FIG. 6 is a diagram showing one example of a method of generating first brightness conversion data according to Embodiment 1.

Using FIG. 6, a method of generating the first brightness conversion data 164 will be described in detail.

The brightness conversion data generation unit 110 performs weighted combination of the HDR brightness conversion data 161 for a dark area and the LDR brightness conversion data 162 for a dark area with the weight represented by the weight information 160. Accordingly, dark area brightness conversion data 501 (dark area correspondence relationship) that is the first brightness conversion data 164 for a dark area is generated.

In this embodiment, the weight information 160 representing a greater weight for a greater size of a bright area in the first image is acquired. In other words, the weight information 160 representing a smaller weight for a greater size of a non-bright area (area other than the bright area) in the first image is acquired.

Therefore, the dark area brightness conversion data 501 is generated such that more display brightness is allocated to a non-dark area as the size of the bright area in the first image is greater. The dark area brightness conversion data 501 is generated such that more display brightness is allocated to a dark area as the size of the bright area in the first image is smaller. In other words, the dark area brightness conversion data 501 is generated such that more display brightness is allocated to a non-dark area as the size of the non-bright area in the first image is smaller. The dark area brightness conversion data 501 is generated such that more display brightness is allocated to a dark area as the size of the non-bright area in the first image is greater.

Specifically, the dark area brightness conversion data 501 is generated to be closer to the HDR brightness conversion data 161 as the size of the bright area in the first image is greater and to be closer to the LDR brightness conversion data 162 as the size of the bright area in the first image is smaller. In other words, the dark area brightness conversion data 501 is generated to be closer to the HDR brightness conversion data 161 as the size of the non-bright area in the first image is smaller and to be closer to the LDR brightness conversion data 162 as the size of the non-bright area in the first image is greater.

Next, the brightness conversion data generation unit 110 generates non-dark area brightness conversion data 502 (non-dark area correspondence relationship) that is the first brightness conversion data 164 for a non-dark area. In this embodiment, the non-dark area brightness conversion data 502 is generated such that the display characteristics of the dark area brightness conversion data 501 and the display characteristics of the non-dark area brightness conversion data 502 are smoothly connected. In this embodiment, the non-dark area brightness conversion data 502 is generated, such that the display brightness does not decrease with respect to an increase in the gradation value, and the display brightness corresponding to the upper limit value of the gradation value (light intensity value) of the first image coincides with the upper limit value of the display brightness.

Then, the brightness conversion data generation unit 110 generates the first brightness conversion data 164 by adding the non-dark area brightness conversion data 502 to the dark area brightness conversion data 501.

The method of generating the first brightness conversion data 164 is not limited to the method described above. For example, although weighted combination is performed only for a dark area in this embodiment, weighted combination may be performed for the entire gradation range.

As described above, the brightness conversion data generation unit 110 outputs the LDR brightness conversion data 162 as the second brightness conversion data 165.

(Gamma Conversion)

Specific processing of the gamma conversion unit 114 will be described.

The gamma conversion unit 114 acquires the driving characteristics information 169 from the control unit 116. Then, the gamma conversion unit 114 converts the gradation value of each pixel of the combined image data 168 according to the driving characteristics (change in display brightness with respect to a change in the driving gradation value) represented by the driving characteristics information 169. Accordingly, the combined image data 168 is converted to the display image data 170. In the case where the driving characteristics of the display unit 115 are 1/2.2 gamma characteristics, the gradation value of each pixel of the combined image data 168 is converted such that the display characteristics that are a change in the display brightness with respect to a change in the gradation value of the display image data become the 1/2.2 gamma characteristics.

As described above, in this embodiment, the first image is converted to the third image with a correspondence relationship of the gradation value and the display brightness that is closer to the correspondence relationship in the second image as the size of a bright area in the first image is smaller. The first image is converted to the third image with a correspondence relationship of the gradation value and the display brightness that is closer to the correspondence relationship in the first image as the size of a bright area is greater. A combined image is generated by combining the second image and the third image, and the combined image is displayed. Accordingly, suitable adjustment of the display brightness of a plurality of images is made possible, even in the case where the dynamic ranges of the plurality of images used for generating a combined image differ from each other. Specifically, in the case where the size of a bright area is large, the third image in which a decrease in the gradation value of a bright area (number for display brightness allocated to a bright area) is suppressed can be generated. Accordingly, blown-out highlights in the third image can be suppressed, and suitable adjustment of the display brightness of the third image is made possible. In the case where the size of a bright area is small, the third image in which visibility (visibility of a dark area) is close to that of the second image can be generated. Accordingly, the second image and the third image are made easily comparable, and suitable adjustment of the display brightness of the images is made possible. As the correspondence relationship (correspondence relationship of the gradation value and the display brightness) in the third image, a correspondence relationship resulting from weighted combination of the correspondence relationship in the first image and the correspondence relationship in the second image is determined. Accordingly, the third image having a correspondence relationship suited for adjustment of the display brightness can be generated, even in the case where the correspondence relationship in the first image or the second image has changed due to a change in the dynamic range of the first image or the second image.

The first gradation conversion unit 103 may be arranged in a stage after the first brightness conversion unit 111. In that case, it suffices that the gradation value of the first image data 101 be converted to a data brightness value in the color space conversion unit 107, in consideration that the gradation characteristics of the first image data 101 are logarithmic. Then, it suffices that the gradation value of the first image data 101 be converted in the first brightness conversion unit 111, in consideration that the gradation characteristics are logarithmic.

The second gradation conversion unit 104 may be arranged in a stage after the second brightness conversion unit 112. In that case, it suffices that the gradation value of the second image data 102 be converted in the second brightness conversion unit 112, in consideration that the gradation characteristics of the second image data 102 are 1/2.2 gamma characteristics.

In this embodiment, an example in which the correspondence relationship (correspondence relationship of the gradation value and the display brightness) in the third image is determined based on the size of a bright area in the first image has been described, but this is not limiting. For example, a correspondence relationship that is closer to the correspondence relationship in the second image as the gradation value representing a bright area (maximum value, minimum value, average value, mode value, intermediate value, or the like of the gradation value of the bright area) in the first image is smaller may be determined as the correspondence relationship in the third image. Specifically, it may be such that over-white pixels are detected from a plurality of pixels of the brightness data 156, and the average value (average brightness value) of the data brightness value of the over-white pixels is acquired (calculated) as the gradation value representing the bright area in the first image. A value that is greater when the average brightness value is greater may be determined as the weight of the HDR brightness conversion data 161.

Accordingly, the first image can be converted to the third image with a correspondence relationship of the gradation value and the display brightness that is closer to the correspondence relationship in the second image when a bright area in the first image is darker. The first image can be converted to the third image with a correspondence relationship of the gradation value and the display brightness that is closer to the correspondence relationship in the first image when a bright area is brighter.

The correspondence relationship in the third image may be determined using both of the size of a bright area in the first image and the gradation value representing the bright area in the first image.

In this embodiment, an example in which the LDR brightness conversion data 162 is used as the second brightness conversion data 165 has been described, but this is not limiting. For example, the first brightness conversion data 164 may be used as the second brightness conversion data 165. If the first brightness conversion data 164 is used as the second brightness conversion data 165, the second image can be converted in the second brightness conversion unit 112 to a fourth image with a correspondence relationship of the gradation value and the display brightness that is equivalent to the correspondence relationship in the third image. In that case, the image combination unit 113 generates a combined image by combining the third image and the fourth image. By using the first brightness conversion data 164 as the second brightness conversion data 165, the visibilities of a dark area in the first image and the second image can be caused to coincide. Note that, in the case where the first brightness conversion data 164 is used as the second brightness conversion data 165, there may be times when a correspondence relationship in which the number for display brightness allocated to a dark area is smaller than in the correspondence relationship in the second image is used as the correspondence relationship in the fourth image, and the fourth image is generated to be darker than the second image.

It may be possible to switch between and execute processing in which the LDR brightness conversion data 162 is used as the second brightness conversion data 165 and processing in which the first brightness conversion data 164 is used as the second brightness conversion data 165. For example, one of the processing in which the LDR brightness conversion data 162 is used as the second brightness conversion data 165 and the processing in which the first brightness conversion data 164 is used as the second brightness conversion data 165 may be selected, in accordance with a selection signal 163 output from the control unit 116. Then, the selected processing may be executed. Which processing of the two is executed may be determined automatically or may be determined in accordance with user operation. Specifically, the brightness conversion data generation unit 110 switches between presence and absence of conversion processing depending on user setting. The processing in which the LDR brightness conversion data 162 is used as the second brightness conversion data 165 is preferable in the case where the display brightness of the second image is to be maintained. The processing in which the first brightness conversion data 164 is used as the second brightness conversion data 165 is preferable in the case where the visibilities of a dark area in the first image and the second image are to be caused to coincide.

<Embodiment 2>

An image processing apparatus and an image processing method according to Embodiment 2 of the present invention will be described below with reference to the drawings.

In Embodiment 2, a suitable processing method in the case where a first image is a video image and the dynamic range of the first image changes between frames of the first image will be described. The dynamic range of the first image changes due to switching or the like of capturing mode of the image capturing apparatus 180, for example.

The dynamic range of the first image changes depending on the capturing mode of the image capturing apparatus 180 and may be various dynamic ranges, from a narrow dynamic range to a wide dynamic range.

When the dynamic range of the first image changes, the HDR brightness conversion data 161 changes, and the first brightness conversion data 164 also changes. When the first brightness conversion data 164 changes drastically in the middle of the video image, the display brightness of a third image changes drastically, and the display brightness of a combined image also changes drastically. As a result, flicker occurs in a screen.

In this embodiment, a method that enables suitable adjustment of the display brightness of a plurality of images used for generating a combined image and that can suppress the occurrence of the flicker will be described.

The difference (in configuration or processing) from Embodiment 1 will be described below in detail, and description for the same points as in Embodiment 1 will be omitted.

Figure 7:
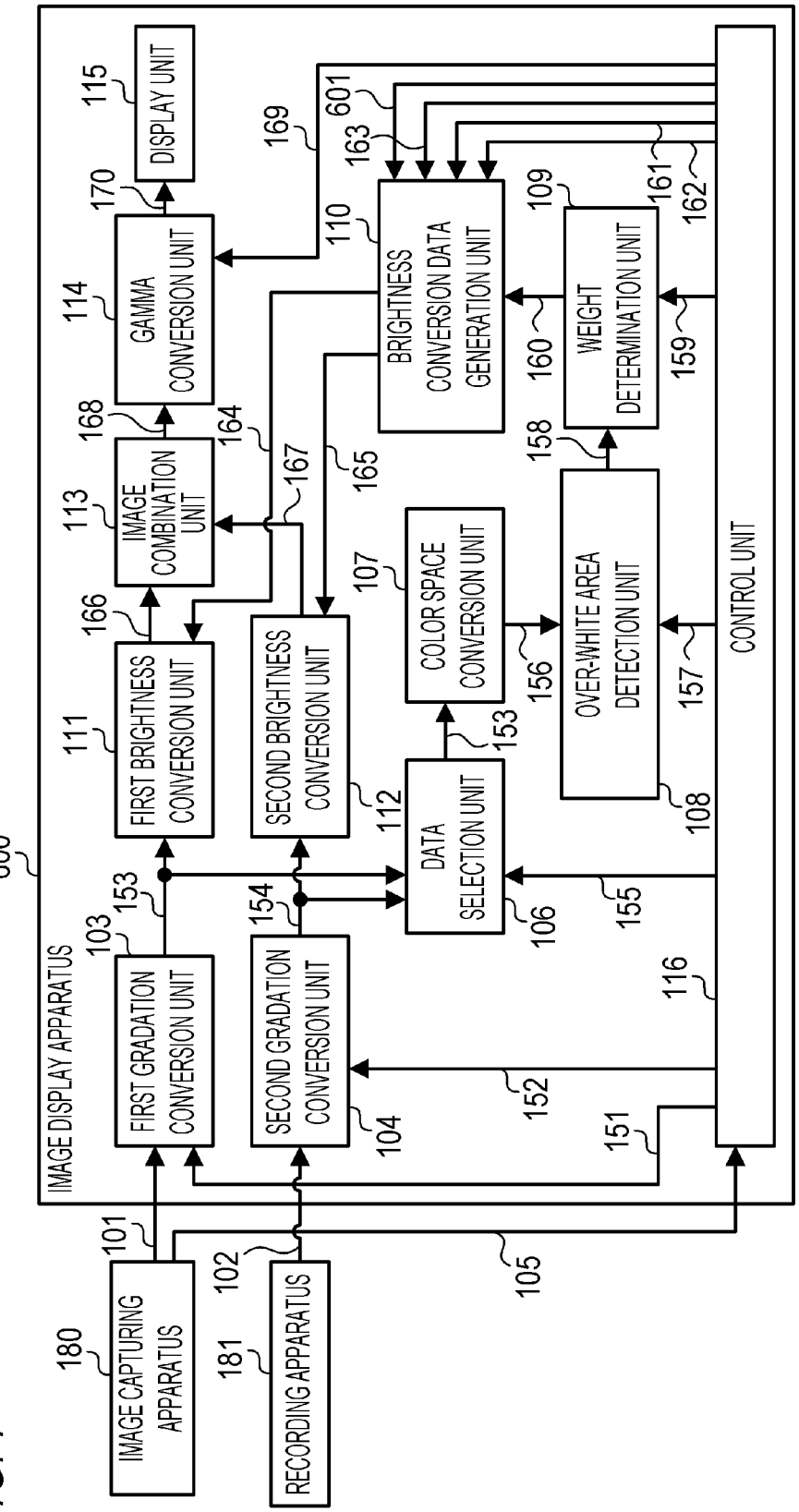
FIG. 7 is a block diagram showing one example of the functional configuration of an image display apparatus according to Embodiment 2.

FIG. 7 is a block diagram showing one example of the functional configuration of an image display apparatus 600 according to this embodiment. As shown in FIG. 7, the image display apparatus 600 has the same functional units as for the image display apparatus 100 in Embodiment 1 (FIG. 1).

Note that, in this embodiment, the first gradation conversion unit 103 acquires the first image data 101 for each frame. Hereinafter, a current frame (being processed) is referred to as "current frame," and a frame immediately before a current frame is referred to as "previous frame."

In this embodiment, the first image is converted to the third image for each frame by switching between and executing first conversion processing and second conversion processing at any timing. The first conversion processing is processing in which the first image of the current frame is converted to the third image with a correspondence relationship of the gradation value and the display brightness that is equivalent to that in the third image of the previous frame. The second conversion processing is processing in which the first image of the current frame is converted to a third image having a correspondence relationship resulting from weighted combination of the correspondence relationship in the second image and the correspondence relationship in the first image of the current frame.

Specifically, the brightness conversion data generation unit 110 outputs the first brightness conversion data 164 for each frame by switching between and executing first output processing and second output processing at any timing. In the first output processing, first brightness conversion data that is the same as first brightness conversion data for the previous frame is output as first brightness conversion data for the current frame. In the case where the first output processing has been performed, the first conversion processing is performed. In the second output processing, the first brightness conversion data is generated by performing weighted combination of LDR brightness conversion data and HDR brightness conversion data corresponding to the dynamic range of the first image of the current frame. Then, the generated first brightness conversion data is output as the first brightness conversion data for the current frame. In the case where the second output processing has been performed, the second conversion processing is performed.

In this embodiment, one of the first output processing and the second output processing is selected in accordance with a switch signal 601 output from the control unit 116, and the selected processing is executed. Which one of the first output processing and the second output processing is executed may be determined automatically or may be determined in accordance with user operation.

Using FIG. 8, the details of the first output processing will be described.

Figure 8:
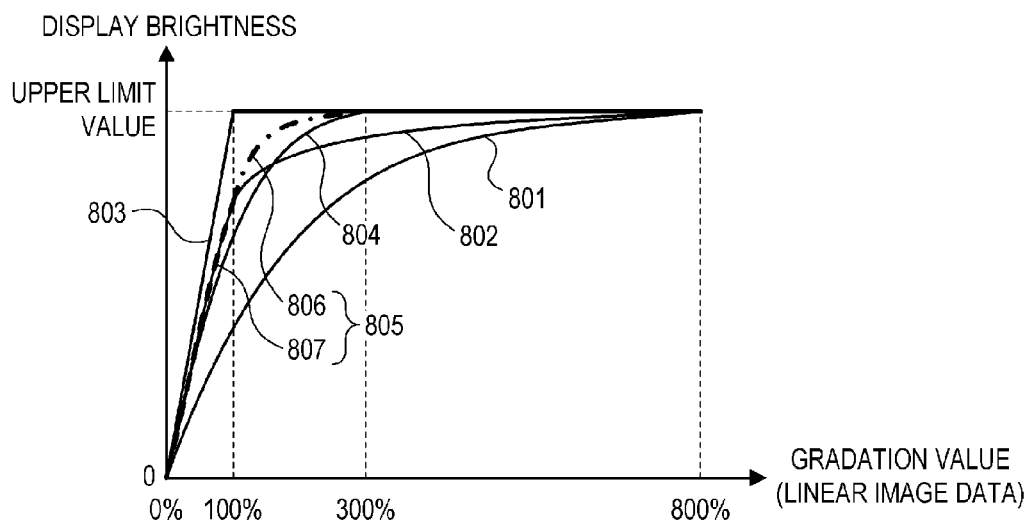
FIG. 8 is a diagram showing one example of first output processing according to Embodiment 2.
Figure 9:
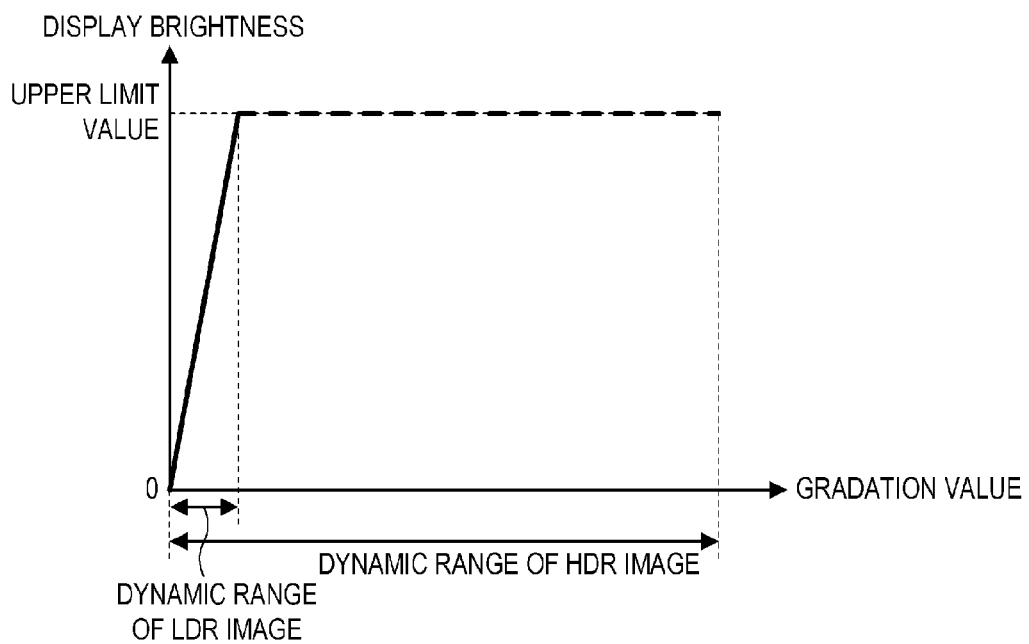
FIG. 9 is a diagram showing one example of the display characteristics of an LDR image.

In FIG. 8, reference numeral 801 denotes HDR brightness conversion data corresponding to the first image of the previous frame, and reference numeral 802 denotes first brightness conversion data for the previous frame. Reference numeral 803 denotes LDR brightness conversion data. The dynamic range of the first image of the previous frame is a gradation range of 0% to 800%. The first brightness conversion data 802 is first brightness conversion data (first brightness conversion data generated from the HDR brightness conversion data 801 and the LDR brightness conversion data 803) generated with a method similar to that in Embodiment 1.

In FIG. 8, reference numeral 804 denotes HDR brightness conversion data corresponding to the first image of the current frame, and reference numeral 805 denotes first brightness conversion data for the current frame. The dynamic range of the first image of the current frame is a gradation range of 0% to 300%.

As shown in FIG. 8, in the first output processing, dark area brightness conversion data 806 with characteristics equivalent to those of the first brightness conversion data 802 for the previous frame is generated upon generating the first brightness conversion data 805 for the current frame. Then, for a gradation range of 100% to 300%, non-dark area brightness conversion data 807 is generated to smoothly connect with the dark area brightness conversion data 806. The method of generating the non-dark area brightness conversion data is the same as that in Embodiment 1. Then, by adding the dark area brightness conversion data 806 to the non-dark area brightness conversion data 807, the first brightness conversion data 805 for the current frame is generated.

In the example in FIG. 8, only the correspondence relationship for a dark area is maintained. However, the correspondence relationship may be maintained for the entire gradation range. Note that, if the correspondence relationship is maintained for the entire gradation range, there may be times when the number for display brightness allocated to a non-dark area decreases.

In this embodiment, the first conversion processing is executed in any period. Accordingly, in any period in which the first conversion processing is executed, the occurrence of flicker in a screen due to a change in the dynamic range of the first image can be suppressed. With processing similar to that in Embodiment 1, it is possible to suitably adjust the display brightness of a plurality of images used for generating a combined image.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139478, filed on Jul. 7, 2014, which is hereby incorporated by reference herein in its entirety.

What is claimed is:

1. An image processing apparatus comprising:
a first acquisition unit configured to acquire a first image;
a second acquisition unit configured to acquire a second image that is different in dynamic range from the first image;
a characteristics acquisition unit configured to acquire, from the first image, characteristics information representing at least one of a gradation value representing a bright area that is an area in the first image and is an area formed of a pixel with a gradation value greater than or equal to a first threshold value, and a size of the bright area;
a first conversion unit configured to convert the first image to a third image by performing image processing in which a correspondence relationship of a gradation value and display brightness is made closer to a correspondence relationship in the second image, based on the characteristics information acquired by the characteristics acquisition unit; and
a combination unit configured to generate a combined image by combining the second image and the third image.

2. The image processing apparatus according to claim 1, wherein the first conversion unit converts the first image to a third image with a correspondence relationship of the gradation value and display brightness that is closer to a correspondence relationship in the second image as the gradation value representing the bright area is smaller.

3. The image processing apparatus according to claim 1, wherein the first conversion unit converts the first image to a third image with a correspondence relationship of the gradation value and display brightness that is closer to a correspondence relationship in the second image as the size of the bright area is smaller.

4. The image processing apparatus according to claim 1, wherein the characteristics information represents a proportion of a total number of pixels of the bright area with respect to a total number of pixels of the first image, as the size of the bright area.

5. The image processing apparatus according to claim 1, wherein the characteristics information represents an average value of the gradation value of the bright area, as the gradation value representing the bright area.

6. The image processing apparatus according to claim 1, further comprising a second conversion unit configured to convert the second image to a fourth image with a correspondence relationship of a gradation value and display brightness equivalent to a correspondence relationship in the third image,
wherein the combination unit generates a combined image by combining the third image and the fourth image.

7. The image processing apparatus according to claim 1, wherein
the first acquisition unit acquires a first image for each frame,
a correspondence relationship in the first image changes depending on a dynamic range of the first image,
the first conversion unit converts a first image for each of the frames to a third image by switching between and executing, at any timing, first conversion processing in which a first image of a current frame is converted to a third frame that is equivalent in correspondence relationship of the gradation value and display brightness to a third image of a frame immediately before the current frame, and second conversion processing in which the first image of the current frame is converted to a third image having a correspondence relationship resulting from weighted combination of a correspondence relationship in the second image and a correspondence relationship in the first image of the current frame, and
the combination unit generates a combined image for each of the frames.

8. The image processing apparatus according to claim 1, wherein the correspondence relationship is a dark area correspondence relationship that is a correspondence relationship of a gradation value less than or equal to a second threshold value and display brightness.

9. The image processing apparatus according to claim 8, wherein the first conversion unit determines, as a non-dark area correspondence relationship in the third image, a non-dark area correspondence relationship that is a correspondence relationship of the gradation value greater than or equal to the second threshold value and display brightness, and that is smoothly connected with the dark area correspondence relationship in the third image.

10. The image processing apparatus according to claim 1, wherein a dynamic range of the second image is narrower than a dynamic range of the first image.

11. The image processing apparatus according to claim 1, wherein a dynamic range of the second image is a part of a dynamic range of the first image.

12. An image processing method comprising:
a first acquisition step of acquiring a first image including a bright area;
a second acquisition step of acquiring a second image that is different in dynamic range from the first image;
a characteristics acquisition step of acquiring, from the first image, characteristics information representing at least one of a gradation value representing the bright area in the first image and is an area formed of a pixel with a gradation value greater than or equal to a threshold value, and a size of the bright area in the first image;
a conversion step of converting the first image to a third image by performing image processing to adjust a correspondence relationship of a gradation value and display brightness of the first image based on a correspondence relationship in the second image and the characteristics information acquired in the characteristics acquisition step; and
a combination step of generating a combined image by combining the second image and the third image.

13. A non-transitory computer readable medium that stores a program, wherein the program causes a computer to execute an image processing method including;
a first acquisition step of acquiring a first image including a bright area;
a second acquisition step of acquiring a second image that is different in dynamic range from the first image;
a characteristics acquisition step of acquiring, from the first image, characteristics information representing at least one of the gradation value representing the bright area in the first image and is an area formed of a pixel with a gradation value greater than or equal to a threshold value, and a size of the bright area in the first image;
a conversion step of converting the first image to a third image by performing image processing to adjust a correspondence relationship of a gradation value and display brightness of the first image based on a correspondence relationship in the second image and the characteristics information acquired in the characteristics acquisition step; and
a combination step of generating a combined image by combing the second image and the third image.

14. An image processing apparatus comprising;
one or more processors; and
one or more memories storing a program which, when executed by the one or more processors, causes the image processing apparatus to execute:
a first acquisition step of acquiring a first image including a bright area;
a second acquisition step of acquiring a second image that is different in dynamic range from the first image;
a characteristics acquisition step of acquiring, from the first image, characteristics information representing at least one of the gradation value representing the bright area in the first image and is an area formed of a pixel with a gradation value greater than or equal to a threshold value, and a size of the bright area in the first image;
a first conversion step of converting the first image to a third image by performing image processing to adjust a correspondence relationship of a gradation value and display brightness of the first image based on a correspondence relationship in the second image and the characteristics information acquired in the characteristics acquisition step; and
a combination step of generating a combined image by combining the second image and the third image.

15. The image processing apparatus according to claim 14, wherein the characteristics information represents a proportion of a total number of pixels of the bright area with respect to a total number of pixels of the first image, as the size of the bright area.

16. The image processing apparatus according to claim 14, wherein the characteristics information represents an average value of the gradation value of the bright area, as the gradation value representing the bright area.

17. The image processing apparatus according to claim 14, wherein the image processing apparatus caused by executing the program further executes:
   a second conversion step of converting the second image to a fourth image with a correspondence relationship of a gradation value and display brightness equivalent to a correspondence relationship in the third image, and
   in the combination step, a combined image is generated by combining the third image and the fourth image.

18. The image processing apparatus according to claim 14, wherein
   in the first acquisition step, a first image is acquired for each frame,
   a correspondence relationship in the first image changes depending on a dynamic range of the first image,
   in the first conversion step, for each of the frames, a first image is converted to a third image by switching between and executing, at any timing, first conversion processing in which a first image of a current frame is converted to a third frame that is equivalent in correspondence relationship of the gradation value and display brightness to a third image of a frame immediately before the current frame, and second conversion processing in which the first image of the current frame is converted to a third image having a correspondence relationship resulting from weighted combination of a correspondence relationship in the second image and a correspondence relationship in the first image of the current frame, and
   in the combination step, a combined image is generated for each of the frames.

19. The image processing apparatus according to claim 14, wherein the correspondence relationship is a dark area correspondence relationship that is a correspondence relationship of a gradation value less than or equal to a second threshold value and display brightness.

20. The image processing apparatus according to claim 19, wherein in the first conversion step, a non-dark area correspondence relationship that is a correspondence relationship of the gradation value greater than or equal to the second threshold value and display brightness, and that is smoothly connected with the dark area correspondence relationship in the third image, is determined as a non-dark area correspondence relationship in the third image.

21. The image processing apparatus according to claim 14, wherein a dynamic range of the second image is narrower than a dynamic range of the first image.

22. The image processing apparatus according to claim 14, wherein a dynamic range of the second image is a part of a dynamic range of the first image.

\* \* \* \* \*